United States Patent

Baba et al.

Patent Number: 5,275,069
Date of Patent: Jan. 4, 1994

[54] CONTROL SYSTEM FOR AUTOMATIC TRANSMISSION

[75] Inventors: Fumiaki Baba, Higashi-Hiroshima; Masahito Kitada, Hiroshima, both of Japan

[73] Assignee: Mazda Motor Corporation, Hiroshima, Japan

[21] Appl. No.: 66,594

[22] Filed: May 25, 1993

Related U.S. Application Data

[63] Continuation of Ser. No. 860,039, Mar. 30, 1992.

[30] Foreign Application Priority Data

Mar. 31, 1991 [JP] Japan .................. 3-93510

[51] Int. Cl.⁵ .................. F16H 61/02; F16H 61/04
[52] U.S. Cl. .................. 74/844; 74/869; 74/866
[58] Field of Search ............ 74/844, 866, 867, 868, 74/869

[56] References Cited

U.S. PATENT DOCUMENTS

| | | | |
|---|---|---|---|
| 4,572,029 | 2/1986 | Kinugasa et al. | 74/866 |
| 4,733,581 | 3/1988 | Hasagawa et al. | 74/866 X |
| 4,790,215 | 12/1988 | Hamano | 74/866 |
| 4,894,780 | 1/1990 | Simonyi et al. | 74/866 X |
| 5,014,575 | 5/1991 | Fujiwara et al. | 74/866 |
| 5,101,686 | 4/1992 | Fujiwara et al. | 74/844 |

FOREIGN PATENT DOCUMENTS

2-266158 10/1990 Japan .................. 74/844

Primary Examiner—Dirk Wright
Attorney, Agent, or Firm—Keck, Mahin & Cate

[57] ABSTRACT

A shift control system for an automatic transmission includes a shift gear mechanism for providing a plurality of shift stages of different speed ratios, a plurality of frictional elements, a first valve for controlling a hydraulic fluid supply, a second valve provided in a hydraulic release line to control hydraulic fluid release, a first frictional element included in the plurality of the frictional elements, a second frictional element included in the plurality of the frictional elements, a piston provided in the second frictional element, a timing valve for controlling a supply timing of the hydraulic pressure for the releasing chamber of the second frictional element in response to actuating hydraulic pressure introduced into the first frictional element, an oil temperature detecting device, and a start detecting device for detecting start of engaging operation of the first frictional element. A shift judging device for judging whether or not a shift command in the control unit is made to a specific shift stage in which the first frictional element is engaged and the second frictional element, is released. A shift control mode switching device switches between a first shift control mode and a second shift control mode, the shift control mode switching device selecting the first shift control mode when the temperature of the hydraulic fluid is relatively high, and selecting the second shift control mode when the temperature of the hydraulic fluid is relatively low. Torque shock and engine speed racing can be avoided through the shift operation.

15 Claims, 6 Drawing Sheets

CONTROL SYSTEM FOR AUTOMATIC TRANSMISSION

This is a continuation of application Ser. No. 07/860,039, filed Mar. 30, 1992, abandoned.

BACKGROUND OF THE INVENTION

1. Field of the Invention

The present invention relates to a shift control system for an automatic transmission.

2. Description of the Prior Art

In an automatic transmission for an automotive vehicle, generally, engagement of a plurality of frictional elements provided therein is hydraulically changed to make a shift operation. In other words, the frictional elements are selectively, actuated to switch a power transmitting path to thereby automatically establish a desired shift stage from among a plurality of shift stages of different speed ratios.

If the switching operations of the frictional elements are not made at proper timing, a shift shock or an engine speed race may be undesirably produced because of "a time lag".

In order to deal with such a problem, it has been proposed to provide a timing valve in a hydraulic circuit of the transmission and to subject the timing valve to a pilot pressure which is adjusted for one frictional element so as to accomplish a desirable switching operation timing of another frictional element, as disclosed in Japanese Patent Public Disclosure (JP A) No. 61-45157, laid open to the public in 1986.

In the above publication, a 2–4 brake with a piston is disclosed as the one frictional element. The piston is engaged with both a releasing and an engaging chamber of a hydraulic control circuit so as to move by virtue of a pressure difference between the releasing and engaging chambers to thereby make a switching operation of the 2–4 brake between released and engaged positions. In this case, when the hydraulic pressure is discharged from the engaging chamber or introduced into the releasing chamber, the 2–4 brake is released.

However, in the above structure disclosed in the Japanese Patent Public Disclosure (JP A) 61-45157, the hydraulic fluid has to be provided for not only the one frictional element but also the other frictional element. As a result, the hydraulic pressure for the one frictional element may be temporarily depressed during the switching operation. This phenomenon occurs particularly in at a low temperature because of high viscosity of the hydraulic fluid. When the viscosity of the hydraulic fluid is high, the hydraulic fluid does, not flow fluently in the circuit because of an increase in flowing resistance of the circuit. As a result, it becomes difficult for the hydraulic fluid to be supplied to the other frictional element smoothly.

Therefore, the temporary depression of the hydraulic pressure in the one frictional element may cause "a time lag" in the switching action of the one to the other frictional element so that a shift shock, or engine speed racing, may be produced.

SUMMARY OF THE INVENTION

It is, therefore an object of the present invention to provide a shift control system for an automatic transmission in which a time lag can be effectively prevented when a from one frictional element to the other occurs.

It is another object of the present invention to prevent a shift shock or engine speed racing of the automatic transmission in a shift operation.

The above and other objects of the present invention can be accomplished by a shift control system for an automatic transmission comprising a shift gear mechanism for providing a plurality of shift stages of different speed ratios, a plurality of frictional elements associated with a hydraulic control circuit to be hydraulically actuated for switching a power transmitting path to establish a desired shift stage, a first valve provided in a hydraulic supply line for the frictional elements to control a hydraulic fluid supply, a second valve provided in a hydraulic release line to control hydraulic fluid release with the first and second valves being controlled by shift signals from a control unit, a first frictional element included in the plurality of the frictional elements for being engaged when a hydraulic pressure is introduced into the first frictional element, a second frictional element included in the plurality of the frictional elements, a piston provided in the second frictional element so as to partition a releasing chamber and engaging chamber and to move in accordance with a pressure difference between the releasing and engaging chambers so that the second frictional element is engaged and released, a timing valve for controlling a supply timing of the hydraulic pressure for the releasing chamber of the second frictional element in response to actuating hydraulic pressure introduced into the first frictional element, oil temperature detecting means for detecting temperature of the hydraulic fluid, start detecting means for detecting start of engaging operation of the first frictional element, shift judging means for judging whether or not shift command in the control unit is made to a specific shift stage in which the first frictional element is engaged and the second frictional element is released, and shift control mode switching means for switching between a first shift control mode wherein the timing valve controls the supply timing of the hydraulic pressure into the releasing chamber of the second frictional elements and a second shift control mode wherein the second valve is opened to engage the second frictional element when it is detected that the first frictional element starts engaging. The shift control mode switching means selects the first shift control mode when the temperature of the hydraulic fluid is relatively high, and selects the second shift control mode when the temperature of the hydraulic fluid is relatively low.

In another aspect of the present invention, there is provided speed control means for controlling speed of the hydraulic fluid discharged from the engaging chamber of the second frictional element in addition to the second valve.

According to the present invention, when the oil temperature is too low to neglect the line resistance of the hydraulic fluid, the hydraulic fluid is not introduced into the second frictional element while it is introduced into the first frictional element. As a result, the temporary depression of the hydraulic pressure in the first frictional element can be effectively avoided.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
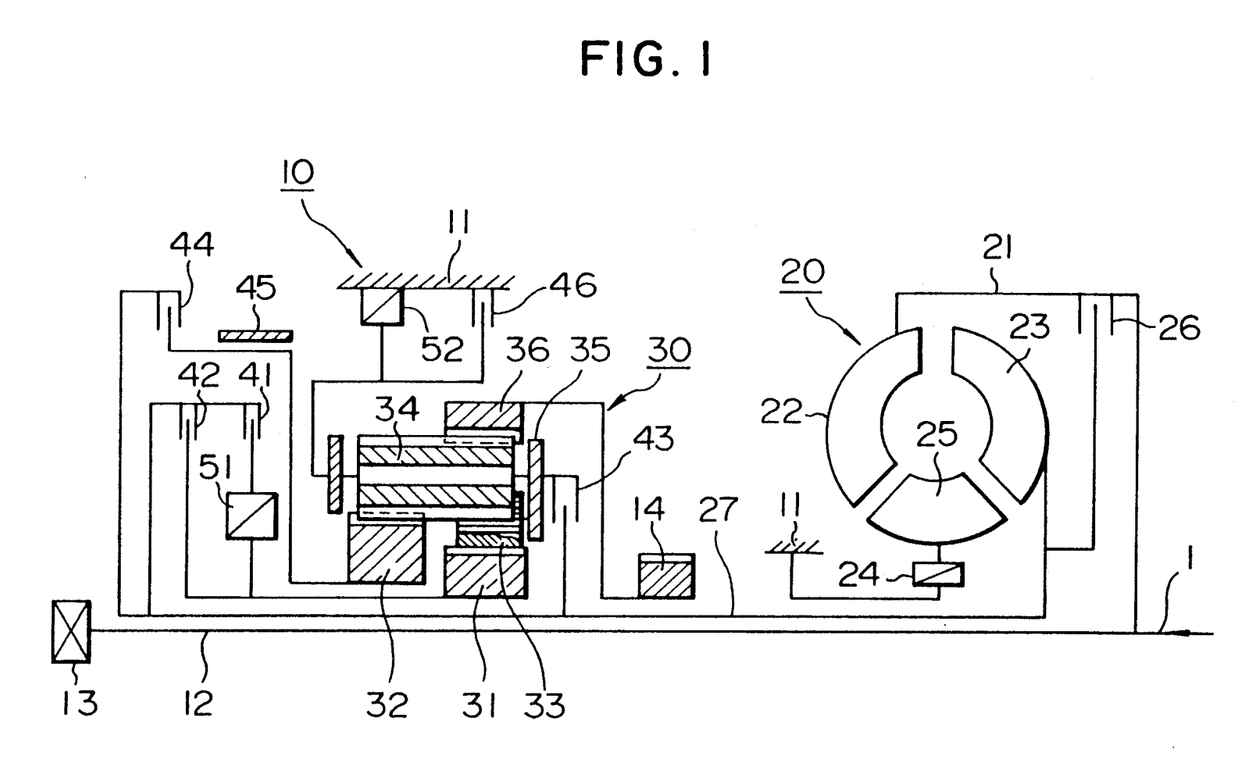
FIG. 1 is a schematic sectional view of an automatic transmission to which a control system in accordance with the present invention can be applied.

Referring to FIG. 1, an automatic transmission 10 according to the present invention includes a torque converter 20, a shift gear mechanism 30 driven by an output of the torque converter 20, a plurality of frictional elements 41-46 and one-way clutches 51 and 52 for switching a power transmitting path of the shift gear mechanism 30 to establish one of the D, 2, and 1-range when running. In the D-range, for instance, 1st 1-4th shift stages are provided.

The torque converter 20 includes a pump 22 provided in a case 21 connected with an engine output shaft 1, a turbine 23 facing the pump 22 to be driven by the pump 22 through a hydraulic fluid, a stator 25 disposed between the pump 22 and the turbine 23 and supported by a transmission case 11 through a one-way clutch 24 so as to amplify torque and a lock-up clutch 26 disposed between the case 21 and the turbine 23 for directly connecting the engaging output shaft 1 with the turbine 23. The rotation of the turbine 23 is transmitted to the shift gear mechanism 30 through the turbine shaft 27.

The engine output shaft 1 is connected with a front end of a pump shaft 12 passing through the turbine shaft 27. The pump shaft 12 drives an oil pump 13 provided at a rear end portion of the automatic transmission 10.

The shift gear mechanism 30 is a Ravigneaux-type planetary gear mechanism and includes a small sun gear 31 movably mounted on the turbine shaft 27, and likewise, a large sun gear 32 movably mounted on the turbine shaft 27 rearward of the small sun gear 31. A plurality of short pinion gears 33 is meshed with the small sun gear 31, a long pinion gear 34 is meshed with the short pinion gear 33 at a front portion and with the large sun gear 32, a carrier 35 for rotatably carrying the long pinion gears 34 and the short pinion gear 33, and a ring gear 36 meshed with a front portion of the long pinion gear 34.

Between the turbine shaft 27 and the small sun gear 31 are disposed a forward clutch 41 and a first one-way clutch 51 in series and a coast clutch 42 in a juxtaposed relationship with the clutches 41 and 51. 3-4 clutch 43 is disposed between the turbine shaft 27 and the carrier 35. Reverse clutch 44 is disposed between the turbine shaft 27 and the large sun gear 32. Between the large sun gear 32 and the reverse clutch 44 is disposed a 2-4 brake 45 as a band brake fixing the large sun gear 32. Between the carrier 35 and the transmission case 11 are disposed a second one-way clutch 52 for supporting the carrier 35 against a reactive force acting thereon and a low reverse brake 46 for fixing the carrier 35 in a juxtaposed arrangement. The ring gear 36 is connected with the output gear 14 through which a rotation is transmitted to right and left wheels (not shown) through a differential mechanism.

FIRST STAGE

The forward clutch is engaged so that the first and second one-way clutches 51 and 52 are locked. As a result, the output of the torque converter is transmitted from the turbine shaft 27 to the small sun gear 31 through the forward clutch 41 and the first one-way clutch 51. In this case, the carrier is fixed by virtue of the second one-way clutch 52 so that the planetary gear mechanism 30 transmits the rotation from the small sun gear 31 to the ring gear through the short pinion gear 33 and the long pinion gear 34. In this case, there is no differential operation in the planetary gear mechanism 30 so that the rotation is transmitted from the small sun gear 31 to the ring gear 36 with a speed reduction ratio of 1.

SECOND STAGE

In addition to the condition of the first stage, the 2-4 brake 45 is actuated so that the large sun gear 32 is fixed and the second one-way clutch 52 is in a racing condition in the planetary gear mechanism 30. The rotation force transmitted from the turbine shaft 27 to the small sun gear 31 is further transmitted to the long pinion gear 34 through the short pinion gear 31. In this case, the long pinion gear 34 rotates around the large sun gear 32 because the large sun gear 32 meshed with the long pinion gear is fixed. As a result, the carrier 35 is rotated. Therefore, compared with the first stage, the rotation speed of the ring gear 36 is increased by the rotation of the carrier 35 or the rotation of the long pinion gear 34 about the large sun gear 32 so that the speed reduction ratio is reduced more than in the first stage.

THIRD STAGE

In the condition of the third stage, the 2-4 brake 45 is released while the 3-4 clutch 43 is engaged so that the rotation of the turbine shaft 27 is transmitted to the small sun gear 31 through the forward clutch 41 and the first one-way clutch 51 and concurrently to the carrier 35 through the 3-4 clutch 43. As a result, the planetary gear mechanism rotates integrally as a whole. Thus, the ring gear 36 rotates as the same speed as the turbine shaft 27.

FOURTH STAGE

In the fourth stage, the 2-4 brake which is once released in the third stage is engaged again. As a result, the rotation of the turbine shaft 27 is transmitted from the 3-4 clutch 43 to the carrier 35 of the planetary gear mechanism 30. Thus, the long pinion gear 34 rotates around the large sun gear 32. In this case, the large sun gear 32 meshed with the long pinion gear 34 is fixed by the 2-4 brake 45 so that the long pinion gear 34 rotates around the large sun gear 32 and its own axis together with the carrier 35. Therefore, the ring gear 36 meshed with the long pinion gear 34 rotates at a speed greater than the speed of carrier 35 or the turbine shaft 27 by the rotation about it own axis. Thus, the fourth stage can be obtained with an overdrive condition. In this case, although the forward clutch 41 is engaged, the first one-way clutch which is engaged with the forward clutch 41 is raced so that the rotation of the turbine shaft 27 is not introduced into the small sun gear 31.

REVERSE STAGE

The reverse clutch 44 and the low-reverse brake 46 are engaged so that the rotation of the turbine shaft 27 is transmitted to the large sun gear 32 through which the rotation is transmitted to the long pinion gear 34 and the ring gear 36 of a fixed gear train.

The frictional elements 41 through 46 are controlled through a hydraulic circuit (partly shown in FIG. 2) so as to be engaged and released in a conventional manner.

The second stage can be obtained by releasing the 3-4 clutch 43 and engaging the 2-4 brake 45. On the other hand, the third stage is established by engaging the 3-4 clutch 43 and releasing the 2-4 brake 45. Therefore, when a shift operation is made from the second to third stages, the 3-4 clutch 43 is switched from the released condition to the engaged condition while the 2-4 brake 45 is switched from the engaged condition to the released condition.

Figure 3:
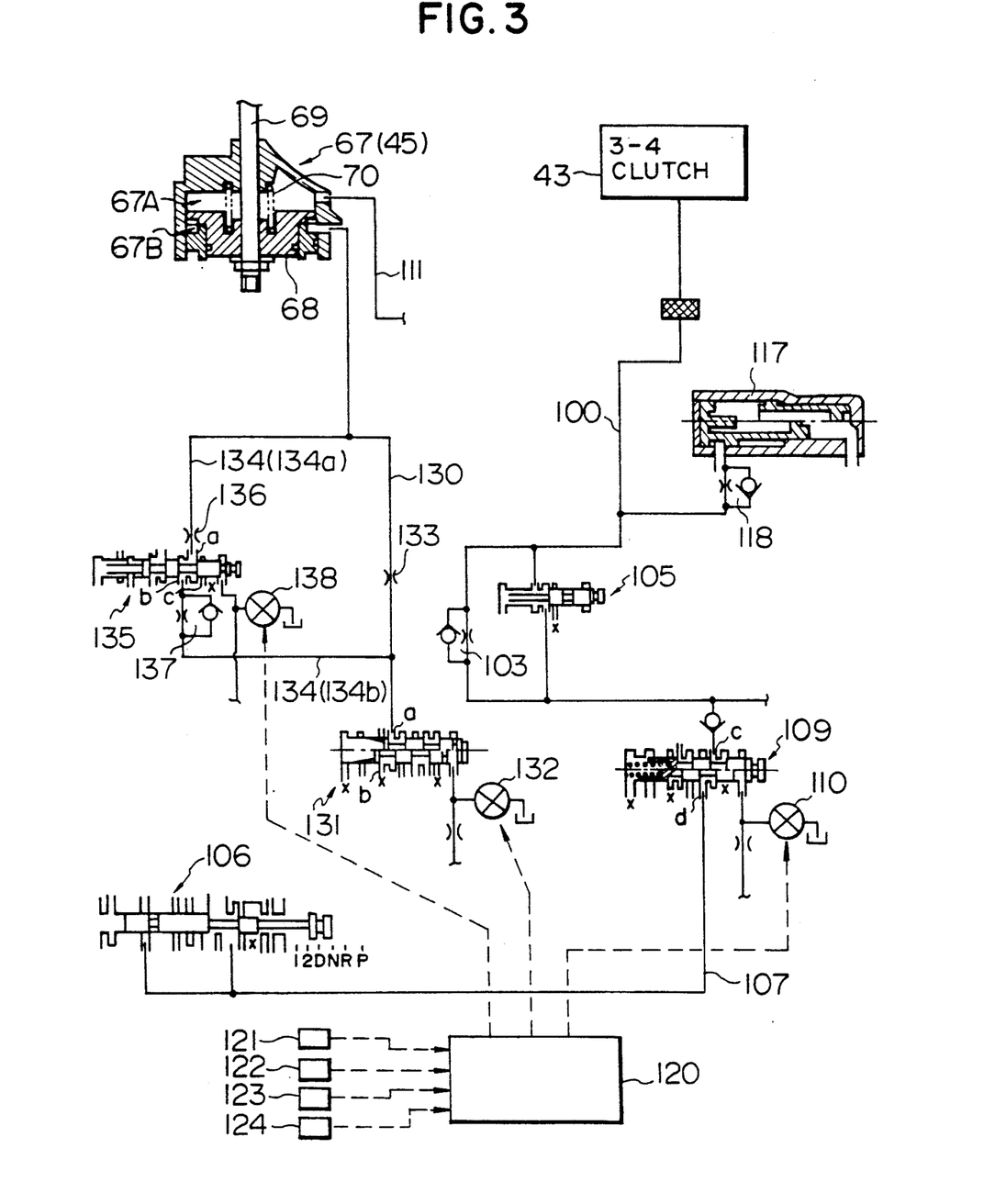
FIG. 3 shows a part of hydraulic control circuit for the 2-3 shift operation.
Figure 4:
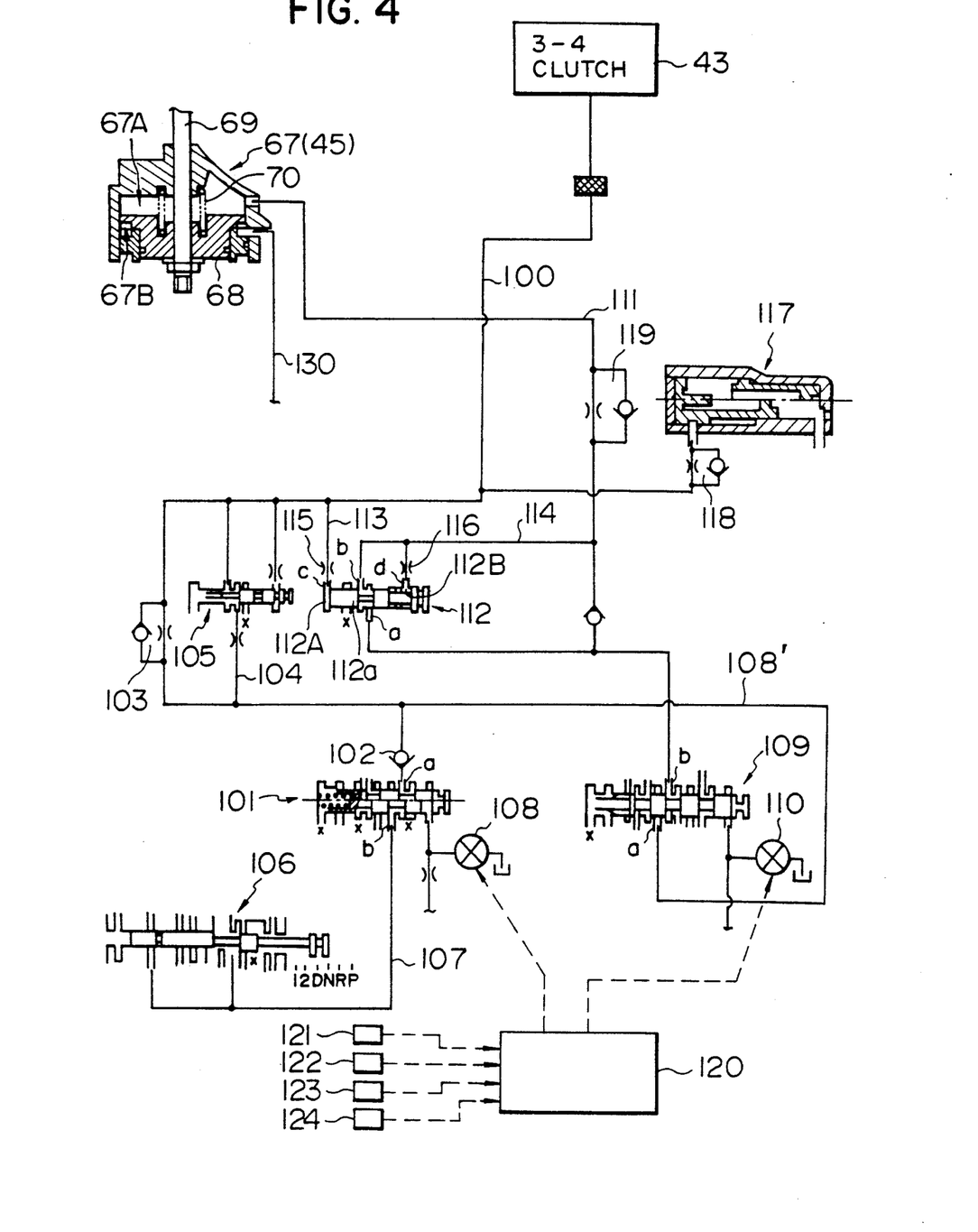
FIG. 4 shows another part of hydraulic control circuit for the 2-3 shift operation.

In FIGS. 3 and 4, there is shown a part of the hydraulic circuit for the automatic transmission 10 which is related to the engagement of the 3-4 clutch 43 and release of the 2-4 brake 45.

The 2-4 brake 45 is provided with actuator 67. Piston 68 is disposed so as to move in a bore of a main body of the actuator 67 and partitions the bore to define releasing chamber 67A and engaging chamber 67B. The piston 68 is integrally provided with actuating rod 69. When the rod 69 is moved upwardly in FIGS. 3 and 4, the 2-4 brake 45 is engaged. Conversely, when the rod 69 is moved downwardly, the 2-4 brake 45 is released. Namely, when the hydraulic fluid is introduced into the releasing chamber 67A, the 2-4 brake 45 is released. Alternatively, when the hydraulic fluid is discharged from the engaging chamber 67B, the released condition is established. Numeral 70 designates a spring urging the piston 68 in the releasing direction. Such kind of actuator is conventional and a detailed explanation thereof is omitted.

In FIG. 4, numeral 100 designates a 3-4 clutch line which is connected with the 3-4 clutch 43. The other end of the clutch line 100 is communicated with port a of 2-3 shift valve 101. Check valve 102 is disposed on the line 100 in the vicinity of the port a. The check valve 102 allows hydraulic fluid to flow from the 2-3 shift valve 101 to the 3-4 clutch 43 and prevent the reverse flow.

A bypass line 104 is provided on the 3-4 clutch line 100 in parallel with one-way orifice 103. Bypass valve 105 is disposed on the bypass line 104.

The 2-3 shift valve 101 is connected at port b with output line 107 communicated with manual valve 106. The line 107 is communicated with a main line (not shown) communicated with a pump when the manual valve is in D-range and 2-range. When first solenoid valve 108 is off, the port a of the 2-3 shift valve 101 is communicated with the port b so that the line pressure of the main line is supplied to the 3-4 clutch 43 to be engaged through the output line 107, 2-3 shift valve 101, 3-4 clutch line 100. Base pressure supply line 108' is connected with the 3-4 clutch line 100 between the check valve 102 and connecting point of the bypass line 104 at one end. The other end of the pressure supply line 108' is connected with port a of 3-4 shift valve 109. The 3-4 shift valve 109 is connected with release pressure supply line 111 at port b. The other end of the release pressure line 111 is connected with releasing chamber 67A of the 2-4 brake 45.

When second solenoid valve 110 is off, the port a of the 3-4 shift valve is communicated with the port b so that the line pressure is introduced to the release pressure supply line 111 from the 3-4 clutch line 100 through the base pressure supply line 108. This line pressure is further introduced into releasing chamber 67A of the 2-4 brake 45. 2-3 timing valve 112 opens and closes the line 111. The line 111 is connected with port a and port b of the 2-3 timing valve 112. In this operation, port a of the 2-3 timing valve is communicated with port b thereof, when spool 112a is moved rightward in the drawing while and interrupted from the port b when the spool 112 is moved leftward. The timing valve is formed with left chamber 112A and right chamber 112B partitioned by the spool 112a. Port c open to the left chamber 112A is communicated with first pilot line 113 continued to the 3-4 clutch line 100. Port d open to the right chamber 112B is communicated with second pilot line 114 continued to the line 111 at a point closer to the 2-4 brake 45 than the 2-3 timing valve. On the first and second pilot lines 113 and 114 are disposed orifices 115 and 116.

In this structure, supply of the hydraulic fluid is made based on the pressure balance between the hydraulic pressure of the releasing chamber 67A and actuating pressure for the 3-4 clutch 43. As a result, releasing timing of the 2-4 brake 45 is controlled in conjunction with engaging timing of the 3-4 clutch 43.

In FIG. 4, numeral 117 designates 2-3 accumulator for providing damping action when the 3-4 clutch 43 is being engaged. The 2-3 accumulator 117 is communicated with the 3-4 clutch line 100 through one-way orifice 118. One-way orifice 119 is disposed on the release pressure supply line 111 at a point closer to the 2-4 brake 45 than the 2-3 time valve 112.

Figure 2:
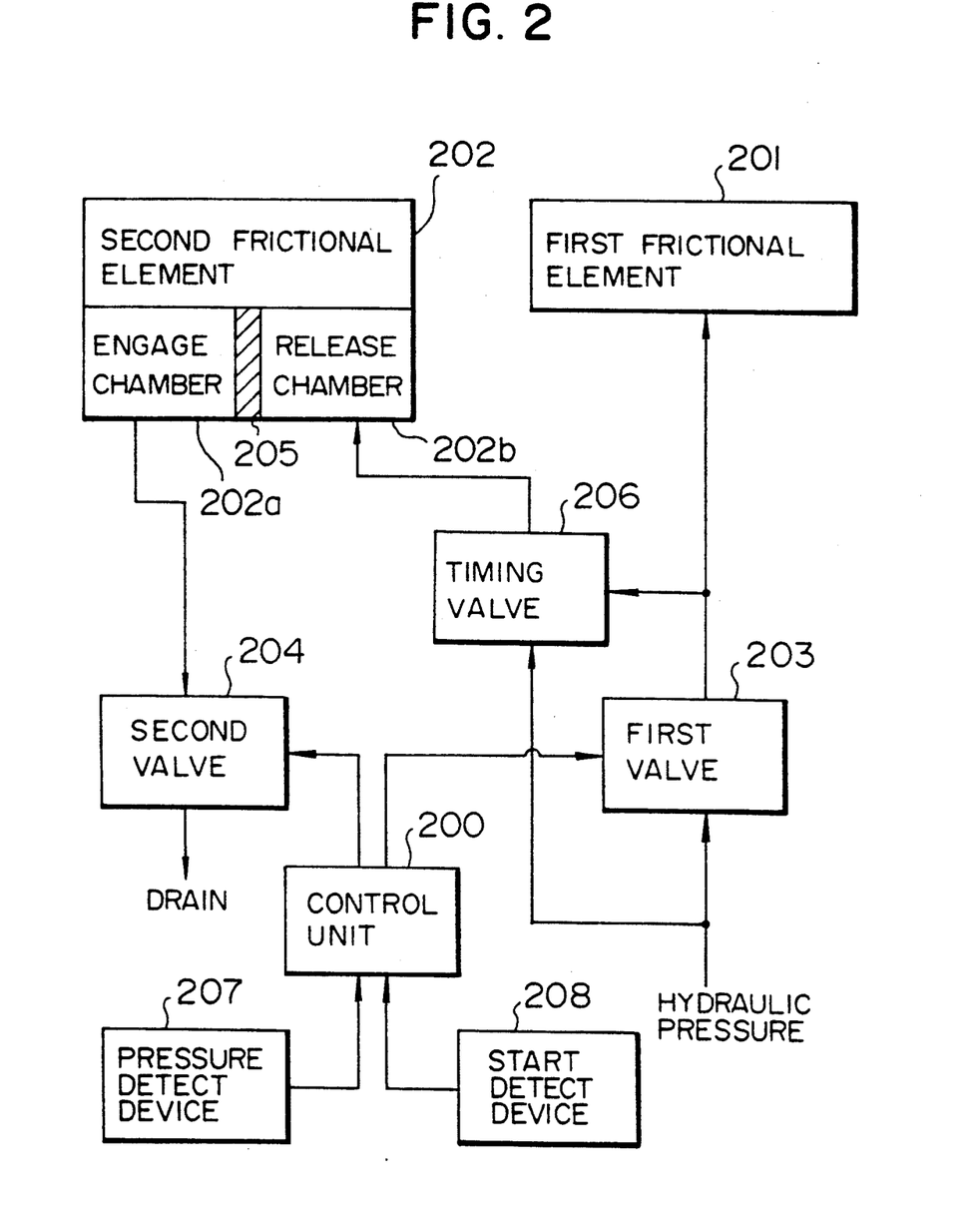
FIG. 2, is a block chart of the control system according to the present invention.

Number 120 designates a control unit made by a micro-computer. The control unit 120 includes CPU, ROM, RAM and the like as known. The control unit 120 receives signals from the sensors 121-124. The sensor 121 is one which detects vehicle speed.

The sensor 122 is one which detects throttle opening or engine load. The sensor 123 is one which detects temperature of the hydraulic fluid or working oil of the hydraulic unit. The sensor 124 detects rotation speed of the turbine shaft 27. The control unit 120 determines a shift control signal based on the vehicle speed and the throttle opening. The shift control signal is introduced in solenoid valves, such as the first and second solenoid valves 108 and 110. As conventionally known, the shift control signal is determined based on the vehicle speed and throttle opening detected in light of up-shift and down-shift control lines in a shift control map (not shown).

Hereinafter, 2-3 up-shift control will be described in connection with components in FIG. 3. FIG. 3 which are the same as those in FIG. 4 are shown by the same numerals as in FIG. 4 and a detailed explanation thereof is omitted. Only a featured portion of FIG. 3 will be explained.

Engaging chamber 67B or the 2-4 brake 45 is connected with one end of pressure apply line 130 which is connected with port a of 1-2 shift valve 131 at the other end. Orifice 133 is disposed on the apply line 130. The 1-2 shift valve 131 is controlled by third solenoid valve 132 of on-off operation. When the third solenoid valve 132 is off, the port a is communicated with drain port b while the port a is interrupted from the port b when the third solenoid valve 132 is on. Thus, when the third solenoid valve is off, the hydraulic fluid is discharged from the engaging chamber 67B of the 2-4 brake 45 through the apply line 130 and the drain port b of the 1-2 shift valve.

Bypass line 134 bypassing the orifice 133 is provided on the bypass line 134. In this case, line 134a is communicated with port a of 3-2 timing valve 135. Line 134b is connected with port b of the 3-2 time valve 135. Orifice 136 is disposed on the line 134a while a one-way valve orifice 137 is disposed on the line 134b.

The 3-2 timing valve 135 is controlled by on-off operation of fourth solenoid valve 138. When the fourth solenoid 138 is on, port a is communicated with port b while the port a is interrupted from the port b and communicated with drain port c when the solenoid 138 is off. Thus, when the fourth solenoid 138 is on, the hydraulic fluid in the engaging chamber 67B of the 2-4 brake 45 is discharged from the drain port b of the timing valve 135 through the bypass line 134a.

In FIG. 3, the second solenoid valve 110 for the 3-4 shift valve 109 is on. When the second solenoid valve 110 is on, port c is brought into communication with port d in the 3-4 shift valve. The port c is communicated with the 3-4 clutch line 100 and the port d is communicated with the output line 107. Thus, when the second solenoid valve 110 is on, the hydraulic fluid is supplied to the 3-4 clutch 43 through a hydraulic path formed by the output line 107, the ports c and d of the 3-4 shift valve 109 and the 3-4 clutch line 110.

In a shift control from the second stage to third stage, the control differs depending on the temperature of the hydraulic fluid, that is, whether the temperature is low or not.

Operation pattern of solenoid valves in the second stage is shown as follows:

First solenoid 108 (ON)
Second solenoid 110 (ON)
Third solenoid 132 (ON)
Fourth solenoid 138 (OFF)

Operation pattern of solenoid valves in the third stage is shown as follows:

First solenoid 108 (ON)
Second solenoid 110 (OFF)
Third solenoid 132 (ON)
Fourth solenoid 138 (OFF)

If this pattern is established in the third stage, 3-4 clutch 43 is engaged and the 2-4 brake 45 is released in FIG. 4.

Hereinafter, there will be described a shift control from the second to third stages making reference to flow charts of FIGS. 5, 6.

Figure 5:
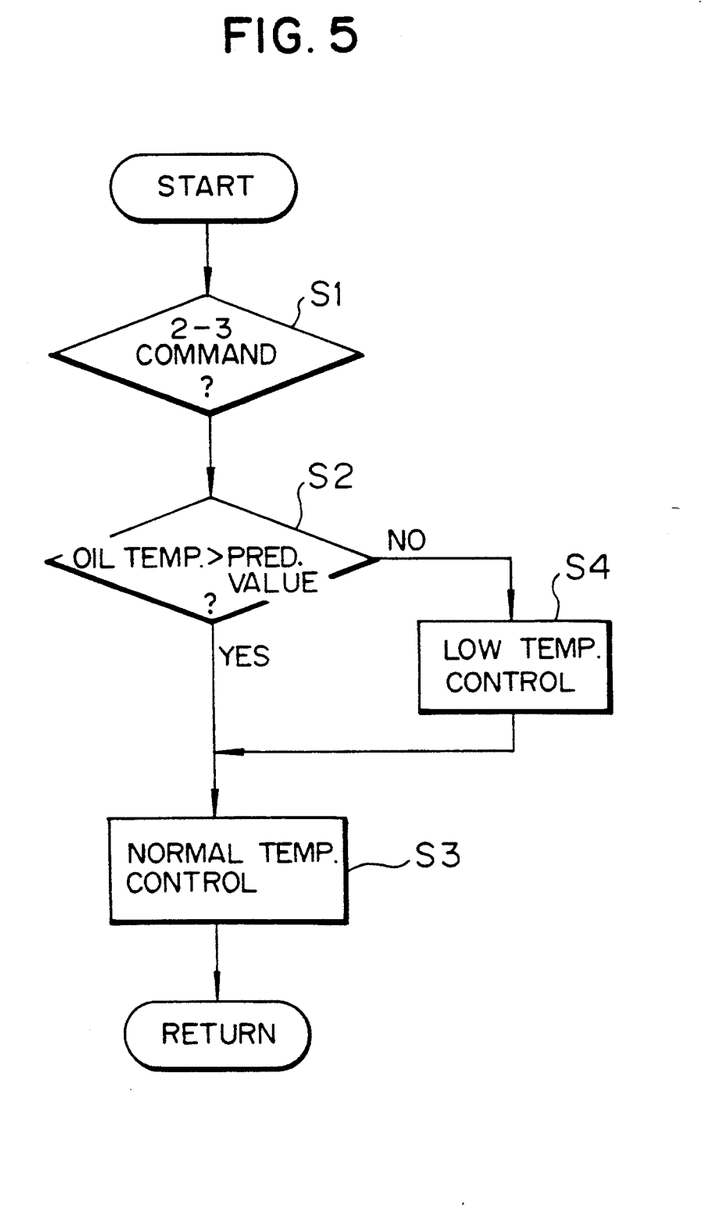
FIG. 5 is a flow chart of a shift control.

In FIG. 5, the control unit 120 judges whether or not 2-3 shift command is made in step S1. If yes, the control unit further judges whether or not the temperature of the hydraulic fluid is higher than a predetermined value in step S2. If this judgment is yes, the oil temperature is considered normal. In this case, the control goes to step S3 and executes the shift control for normal oil temperature. That is, the solenoid pattern is changed from the second to third stage.

In step S2, if the judgment is no, the control unit determines that the oil temperature is low. In this case, the control unit 120 executes step S4 in which a low temperature control is made and thereafter the solenoid pattern is switched to that of third stage.

Figure 6:
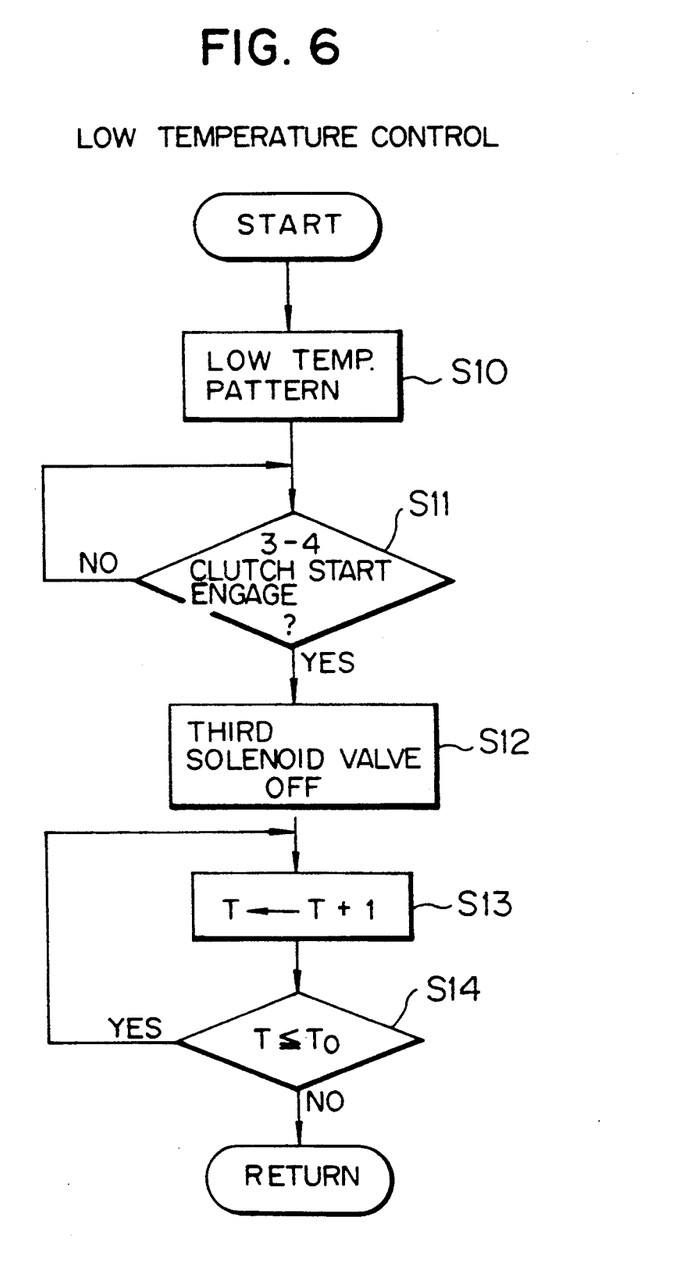
FIG. 6 is a flow chart of a shift control when the oil temperature is relatively low.

FIG. 6 shows a flow chart of the low temperature control. In the low temperature control, the solenoid pattern is switched from the second stage to a low temperature solenoid pattern shown as follows:

First solenoid 108 (OFF)
Second solenoid 110 (ON)
Third solenoid 132 (ON)
Fourth solenoid 138 (OFF)

When the low temperature solenoid pattern is established, the 3-4 clutch starts engaging as shown in FIG. 3 In this case, third solenoid valve 132 is on the fourth solenoid valve 138 is off. Thus, the 2-4 brake 45 is not released.

In step S11, the control unit 120 judges whether or not the 3-4 clutch 43 starts engaging. As conventionally known, the start of engagement of 3-4 clutch 43 is detected based on rotation speed change of the turbine shaft 27.

In step S11, when the judgment is yes, in other words when it is detected from the change of the turbine speed that the 3-4 clutch starts engaging, the control unit 120 goes to step S12 in which the third solenoid valve 132 is switched to off so that the 2-4 brake 45 start releasing.

After a predetermined time period T₀ has passed (steps S13, S14), the solenoid pattern is switched from the low temperature solenoid pattern to that of the third stage.

Alternatively, when it is necessary to increase releasing speed of the 2-4 brake 45 in the case where, for instance, rotation speed change in the turbine shaft 27 is greatly increased, the third solenoid valve 132 can be turned off and concurrently the fourth solenoid valve 138 can be turned on so that the drain port b of the 3-4 timing valve 135 may be opened.

According to the present invention, even when the oil temperature is low, the temporary depression of the hydraulic pressure in the hydraulic circuit for the frictional element can be prevented. As a result, a time lag of the operation between one frictional element and other can be effectively prevented so that the shift operation can be made smoothly irrespective of the oil temperature.

Although the present invention has been explained with reference to a specific, preferred embodiment, one of ordinary skill in the art will recognize that modifications and improvements can be made while remaining within the scope and spirit of the present invention The scope of the present invention is determined solely by the appended claims

What is claimed is:

1. A shift control system for an automatic transmission comprising:
    a shift gear mechanism for providing a plurality of shift stages of different speed ratios,
    a plurality of frictional elements associated with a hydraulic control circuit to be hydraulically actuated for switching a power transmitting path to establish a desired shift stage,
    a first frictional element included in the plurality of frictional elements for being engaged when hydraulic pressure is introduced into the first frictional element,
    a second frictional element included in the plurality of frictional elements,
    a piston provided in the second frictional element so as to partition a releasing chamber and an engaging chamber and move in accordance with a pressure difference between the releasing and engaging chambers so that the second frictional element is engaged when pressure in the engaging chamber is higher than that of the releasing chamber and released when pressure in the releasing chamber is higher than that of the engaging chamber, a first valve provided in a hydraulic supply line for the first frictional element to control a hydraulic fluid supply, a second valve provided in a hydraulic release line to control a hydraulic fluid release from an engaging chamber of the second frictional element, the first and second valves being controlled by shift signals from a control unit, said engaging chamber being connected to said second valve, a first timing valve for controlling a supply timing of hydraulic pressure for the releasing chamber of the second frictional element in response to actuating hydraulic pressure introduced into the first frictional element, oil temperature detecting means for detecting temperature of hydraulic fluid for the automatic transmission, start detecting means for detecting a start of an engaging operation of the first frictional element, shift judging means for judging whether or not a shift command in the control unit is made to a specific shift stage in which the first frictional element is engaged and the second frictional element is released, and shift control mode switching means for switching between a first shift control mode wherein the timing valve controls a supply timing of the hydraulic pressure into the releasing chamber of the second frictional element and a second shift control mode wherein the second valve is opened to release hydraulic fluid from the engaging chamber of the second frictional element to release the second frictional element when it is detected, by said shift judging means, that the first frictional element starts engaging, the shift control mode switching means selecting the first shift control mode when the temperature of the hydraulic fluid is higher than a predetermined value and selecting the second shift control mode when the temperature of the hydraulic fluid is not higher than the predetermined value.

2. A shift control system as recited in claim 1, and further comprising control means for controlling a rate at which hydraulic fluid is discharged from the engaging chamber of the second frictional element.

3. A shift control system as recited in claim 1, wherein the first frictional element is a 3-4 clutch which is engaged when a third stage is established.

4. A shift control system as recited in claim 1, wherein the second frictional element is a 2-4 brake which is released when a third stage is established.

5. A shift control system as recited in claim 1, wherein the first valve is controlled by means of a solenoid valve.

6. A shift control system as recited in claim 1, wherein the second valve is controlled by means of a solenoid valve.

7. A shift control system as recited in claim 1, wherein the shift control mode switching means establishes the first shift control mode after establishing the second shift control mode when the temperature of the hydraulic fluid is not higher than the predetermined value.

8. A shift control system as recited in claim 1, wherein the second valve is opened to engage the second frictional element a predetermined time period after it is detected that the first frictional element starts engaging.

9. A shift control system as recited in claim 1, wherein the timing valve is controlled by a solenoid valve which is controlled by the control unit.

10. A shift control system as recited in claim 2, wherein the control means is controlled by a solenoid valve which is opened to release hydraulic pressure in the engaging chamber.

11. A shift control system as recited in claim 10, wherein the control means comprises an orifice and a second timing valve which are disposed in parallel with each other.

12. A shift control system as recited in claim 11, wherein the second timing valve is controlled by a solenoid valve.

13. A shift control system as recited in claim 12, wherein the first and second valves are controlled by solenoid valves, solenoid valves for the first valve, the second valve and the first timing valve being on and the solenoid valved for the second timing valve being off in a second stage of the transmission.

14. A shift control system as recited in claim 13, wherein the solenoid valves for the first and second valves are off, the solenoid valve for the first timing valve is on and the solenoid valve for the second timing valve is off in a third stage of the transmission.

15. A shift control system as recited in claim 14, wherein a solenoid valve for the first valve is off, the solenoid valves for the second valve and the first timing valve are on and the solenoid valve for the second timing valve is off in the second shift mode which is established between the second and third stages when the oil temperature is not higher than the predetermined value.

* * * * *